No. 771,062.

Patented September 27, 1904.

UNITED STATES PATENT OFFICE.

CARL GROYEN, OF BONN, GERMANY.

PROCESS OF MANUFACTURING ARTIFICIAL STONE FROM MAGNESIT.

SPECIFICATION forming part of Letters Patent No. 771,062, dated September 27, 1904.

Application filed July 8, 1903. Serial No. 164,662. (No specimens.)

*To all whom it may concern:*

Be it known that I, CARL GROYEN, merchant, a subject of the German Emperor, residing at 26 Rheinwerft, in the city of Bonn-on-the-Rhine, Kingdom of Prussia, German Empire, have invented a new and useful Process of Manufacturing Artificial Stone from Magnesit, of which the following is a specification.

This invention has reference to a process of manufacturing artificial stone from oxychlorid of magnesium, and it is distinguished from the processes heretofore in use by providing means whereby the sweating and the efflorescence and the subsequent cracking of the stones as heretofore manufactured is avoided and the stones are given an increased hardness. In the former processes of manufacturing such products by means of the formation of the so-called "Sorel cement," which is a combination of chlorid of magnesium with oxid of magnesium, with or without the addition of easily-decomposible silicates—such as asbestos, water-glass, and the like—it was usual to either mix chlorid of magnesium with magnesit in burned or unburned condition, or chlorid of magnesium was formed in the process of manufacture itself by acting with hydrochloric acid upon the magnesia. Ordinary commercial chlorid of magnesium could only be used with difficulty on account of its very outspoken hygroscopic qualities. This hygroscopicity was even retained in the finished stone, inasmuch as the chlorid of magnesium was only very rarely completely changed into oxychlorid, so that stones of this kind were liable to sweat, the water exuding from the surface of the stone and causing the stone to fall very short of the desired degree of hardness. On the other hand, as regards the formation of chlorid of magnesium in the process of manufacture itself, there was the inconvenience of the vapors of the hydrochloric acid employed being injurious to the workmen and to the machinery and being destructive to any coloring-matter used in the process. Hence only aqueous rather dilute hydrochloric acid has been used for the formation of chlorid of magnesium, and especially in connection with coloring-matter; but operating in this manner the stones showed an exudation of water and were very deficient in hardness, and the sweating resulted in frequent fissures and cracks. Furthermore, a white coating appeared very often on the surface of the finished stone, this coating consisting partly of sulfates formed by impurities contained in the acid and which would effloresce on account of the sweating of the stone. In my invention the chlorid of magnesium is also formed in the mass itself; but instead of dilute I use highly-concentrated hydrochloric acid. Besides, with a view to obviate the difficulties of the prior processes as above explained and in particular in order to avoid destruction of any coloring-matter present, a large excess of magnesit is also added to the mass after the reaction is over, so that the mixture is neutralized and is converted entirely into oxychlorid, a result which cannot be obtained with such perfection by the mere mixing of ready-made chlorid of magnesium with magnesit. The neutralization may be effected or accelerated also by the addition of some ammonia or an equivalent substance. The thus-obtained mass, to which powdered asbestos may, if desired, be added for the purpose of facilitating the setting of the material may be mixed with coloring-matter without injury to the same, and it yields a hard quickly-setting practically anhydrous product which has lost the property of sweating and exudation of water and in its various applications is free from cracks and fissures and from unequal extension by differences of temperature.

The process may, for instance, be carried out by first dissolving forty parts, by weight, of magnesit in two hundred parts, by weight, of hydrochloric acid, either crude or purified concentrated acid. The dissolution is accompanied by high heat. After the solution has been allowed to cool a mixture of two hundred and twenty-five parts dry powdered magnesit and fifty parts powdered asbestos are added thereto and the whole mass is thoroughly mixed, when it assumes a thick pasty appearance and is then poured into suitable molds, where it is allowed to rest for one to twenty-four hours until it has become perfectly hard. The object thus obtained is then removed from the mold and exposed to the air for one to two days, which results in an appreciable increase of hardness. I may also add the whole amount of magnesit to the concentrated hydrochloric acid at once, in which case the mass will, however, harden very quickly, so that it cannot be worked with such facility as in the case where the addition is made in several portions. The proportions indicated are only given by way of example, and they may of course be varied to suit existing conditions and to obtain the necessary hardness in every case. The hardness may still be essentially increased by the addition of cement-like material, of which I may use, for instance, so-called "marble" or "Keane's cement" or mixtures of anhydrous sulfate of alumina and anhydrous gypsum, such as Portland cement, Roman cement, or slag cement. Besides such additions I have found the waste from the manufacture of sulfate of alumina from aluminous rock and similar material to be very suitable, this waste having been shown by analyses to consist, essentially, of a mixture of silicic acid, lime, and alumina with some carbonic acid and very little sulfuric acid. The action of this material is possibly due to the physical change which the silicic acid has undergone in the process of decomposing the silicate of alumina. This material, as well as other cement-like additions, are added during the neutralization of the oxychlorid of magnesium or chlorid of magnesium formed by means of magnesit, whereby the hardening properties of the mixture are considerably increased, inasmuch as these additions are operating to absorb both the water liberated in the formation of the mass as well as any excess of water added in the process of manufacture as well as the water absorbed from the air by the magnesia mixture. When making such additions, I am enabled to decrease the amount of magnesit otherwise necessary, and I have found that in such cases even one hundred and fifty parts of magnesit will do the work of the otherwise-employed two hundred and twenty-five parts. The action of the concentrated hydrochloric acid is not interfered with by these additions.

If it is desired to manufacture imitation marble or other veined or colored artificial stones, part of the mixture which has been prepared ready for molding is taken out and colored by the addition of suitable coloring agents. Thus, for instance, by the addition of powdered pyrolusit, of lithopon white, of cobaltous, and other mineral colors, and the mass is then poured into molds, together with the colored portion, whereby any desired veins similar to marble and agate and any desired decorating effect can be produced. It is obvious that I may use masses of different color at a time in molding, whereby most manifold and remarkable coloring may be produced. When using cement-like additions, the veining is produced in the same manner as in the case of pure magnesit by coloring several small portions of the mass and then incorporating the same with the remainder of the mixture. After the mass has been poured into the mold it may be cut into slices by means of a wire or knife or another device while in a plastic state. These slices or disks, which should be somewhat thicker than the plates to be manufactured therefrom, are preferably placed with their broad surface upon glass plates or molds coated with glass and pressed in order to produce a high finish and increased hardness and a high degree of luster.

As in using highly-concentrated hydrochloric acid the heat produced is considerably greater than in the ordinary process of decomposition by dilute acid, glass plates are not very suitable for producing high polish during the process of formation of the mass, inasmuch as they are apt to crack or to get scratched. I therefore prepare highly-polished stone plates for this purpose—for instance, such made of granite or the like. I may evidently add any desired organic material to produce various effects—such as sawdust, wood-shaving, peat, wood fibers, and the like—as in the case of other artificial stones, and I may also imbed wire-netting or other metal inlays in the mass.

I am aware that concentrated hydrochloric acid has already been employed for dissolving magnesia in the production of marble-like objects; but, while heretofore only so much of the concentrated acid was added that a basic chlorid was obtained, in my invention the magnesia is completely dissolved, and the excess of acid is then neutralized by subsequent additions of magnesia or magnesit and of other neutralizing agents.

What I claim, and desire to secure by Letters Patent of the United States, is—

1. The process of manufacturing artificial stones from magnesit and hydrochloric acid which consists in mixing magnesit in any form or condition with strong concentrated hydrochloric acid, neutralizing the resultant mixture with magnesit and ammonia and incorporating suitable fillers with the mixture.

2. The process of manufacturing artificial stones from magnesit and hydrochloric acid which consists in mixing magnesit in any form or condition with strong concentrated hydrochloric acid, adding magnesit and ammonia to the resultant mass until the acid reaction is removed and pouring the mixture into molds.

3. The process of manufacturing artificial stones which consists in mixing magnesit in any form or condition with hydrochloric acid, forming oxychlorid of magnesium in the mixture, adding a neutralizing agent to the resultant mass and incorporating aluminium-cement with the mixture, substantially as described.

In witness whereof I have hereunto signed my name in the presence of two subscribing witnesses.

CARL GROYEN.

Witnesses:
 W. FREIHERR V. LYNCKER,
 CARL SCHMITT.